(12) United States Patent
Gerding

(10) Patent No.: US 7,908,919 B2
(45) Date of Patent: Mar. 22, 2011

(54) LEVEL METER EMPLOYING THE RADAR PRINCIPLE

(75) Inventor: Michael Gerding, Herne (DE)

(73) Assignee: Krohne Messtechnik GmbH & Co. KG, Duisburg (DE)

( * ) Notice: Subject to any disclaimer, the term of this patent is extended or adjusted under 35 U.S.C. 154(b) by 276 days.

(21) Appl. No.: 12/035,725

(22) Filed: Feb. 22, 2008

(65) Prior Publication Data

US 2008/0264178 A1    Oct. 30, 2008

(30) Foreign Application Priority Data

Mar. 1, 2007   (DE) .......................... 10 2007 010 468

(51) Int. Cl.
*G01F 23/00*   (2006.01)
(52) U.S. Cl. ..................................... 73/290 R; 73/866.5
(58) Field of Classification Search ................ 73/290 R, 73/209 V, 866.5; 324/642, 643
See application file for complete search history.

(56) References Cited

U.S. PATENT DOCUMENTS

| | | | | |
|---|---|---|---|---|
| 4,948,492 A * | 8/1990 | Niedrach et al. | ............. | 204/435 |
| 4,978,921 A * | 12/1990 | Indig et al. | ............. | 324/446 |
| 4,990,855 A * | 2/1991 | Niedrach et al. | ............. | 324/449 |
| 5,043,053 A * | 8/1991 | Indig et al. | ............. | 204/421 |
| 5,217,596 A * | 6/1993 | Indig et al. | ............. | 204/435 |
| 5,391,839 A * | 2/1995 | Lang et al. | ............. | 324/448 |
| 5,669,263 A * | 9/1997 | Borchers et al. | ............. | 73/866.5 |
| 6,118,282 A * | 9/2000 | Grieger | ............. | 73/866.5 |
| 6,227,703 B1 * | 5/2001 | DiMatteo et al. | ............. | 73/866.5 |
| 6,732,580 B2 * | 5/2004 | Dirksen | ............. | 73/149 |
| 7,288,941 B2 * | 10/2007 | Redko et al. | ............. | 324/450 |
| 7,334,451 B1 * | 2/2008 | Fauveau | ............. | 73/1.73 |

* cited by examiner

*Primary Examiner* — Lisa M Caputo
*Assistant Examiner* — Punam Roy
(74) *Attorney, Agent, or Firm* — Cesari and McKenna, LLP; John F. McKenna

(57) ABSTRACT

A level meter, employing the radar principle for measuring the fill level of a medium in a container, includes a signal transmitter serving to transmit an electromagnetic signal, an electric conductor system for conducting the electromagnetic signal into the container and returning reflected components of the electromagnetic signal from the container, and a signal receiver serving to receive the reflected components of the electromagnetic signal. An electric conductor system is provided at its upper end with a suspension by which it is attached to a device on the container. A tensile-load testing device is placed between the suspension and at least a part of the electric conductor system, featuring a break point for the electromagnetic signal, with the distance between the break point and the signal transmitter or the signal receiver varying as a function of the tensile load bearing on the conductor system. This permits easy monitoring of the tensile forces to which the conductor system and the suspension are exposed, so that any damage to these devices as a result of excessive loads can be prevented.

10 Claims, 1 Drawing Sheet

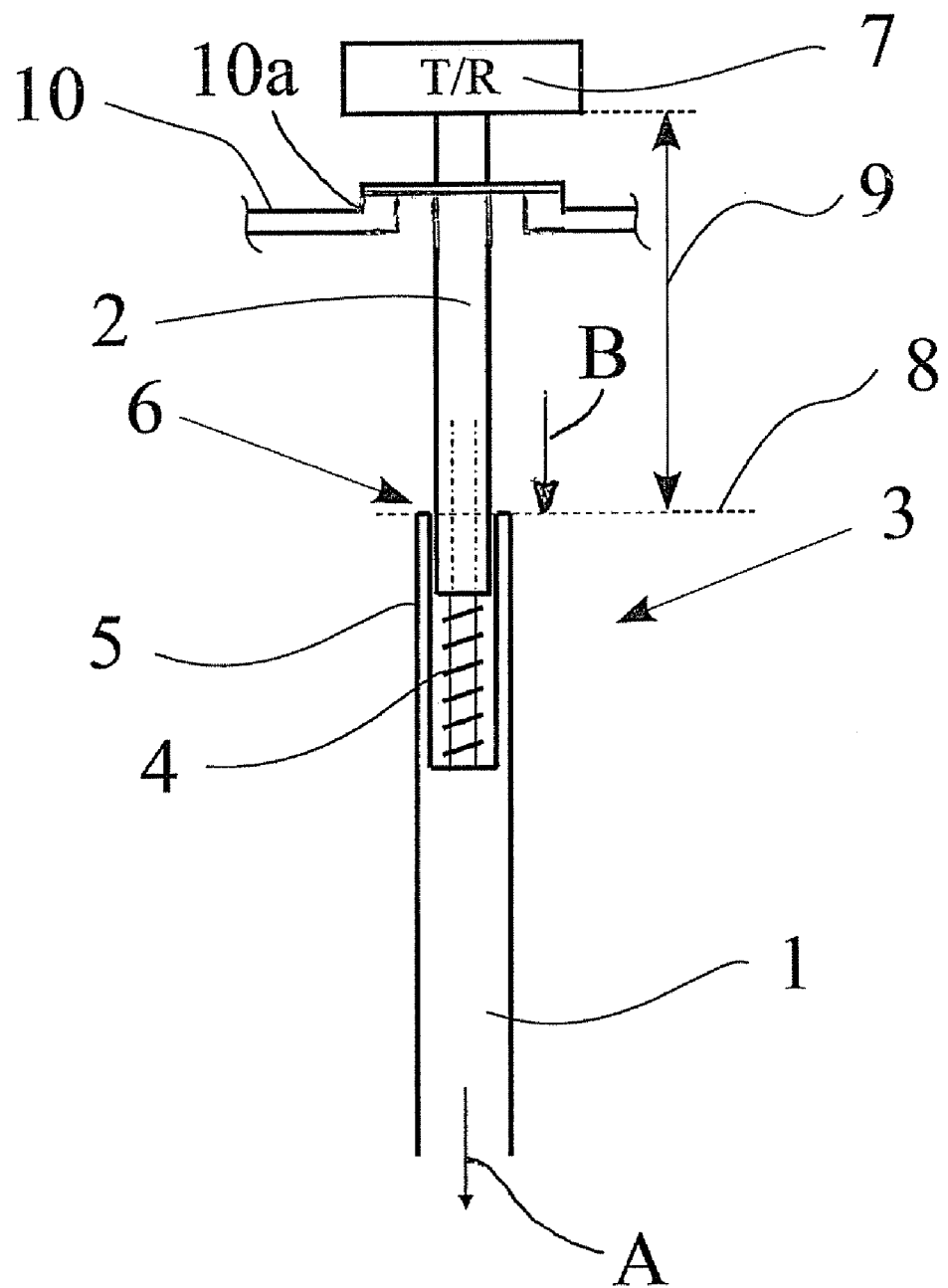

LEVEL METER EMPLOYING THE RADAR PRINCIPLE

BACKGROUND OF THE INVENTION

This invention relates to a level meter that employs the radar principle and serves to measure the fill level of a medium in a container, as well as to a signal transmitter for transmitting an electromagnetic signal, an electric conductor system for conducting the electromagnetic signal into the container and returning reflected components of the electromagnetic signal from the container, and a signal receiver for receiving the reflected components of the electromagnetic signal, with the upper end of the electric conductor system featuring a suspension by which it is attached to a device on the container.

The measuring process of a level meter that employs the radar principle and incorporates an electric conductor system for conducting an electromagnetic signal into and back from the container is based on the time domain reflectometry (TDR) principle applied, for instance, in cable testing and resembles the mode of functional operation of conventional radar systems. In a TDR level meter of this type, for instance, an extremely short electric pulse is transmitted, via an essentially straight conductor system, into a container holding a medium such as a liquid, a powder, or a granular substance whose level is to be measured. Such an electric conductor system typically extends into the medium and is designed as a single-conductor or a dual-conductor assembly.

The short pulse, fed into and guided by an appropriate electric conductor system, travels into the container where it is at least partly reflected back by the surface of the medium, and the reflected component of the short electric pulse is collected by the signal receiver, allowing the determination of its runtime and thus of the level of the medium in the container. The reflected component of the short electric pulse depends on the dielectric constant of the medium and increases with the latter. The runtime of the signal is proportional to the height of the level of the medium in the container. Varying ambient conditions such as a rising or falling atmospheric pressure or rising or falling temperatures do not affect the measuring accuracy of the TDR level meter. Moreover, the runtime of the signal remains unaffected by the dielectric constant of the medium whose level is to be measured.

TDR level meters are occasionally employed in the measurement of the level of liquids a substantial distance away, as well as in granular bulk-material applications. It is especially in granular substance applications that the medium adheres to the conductor system or that process-related movement of the liquid within the container results in major mechanical tensile forces bearing on the conductor system and thus on its suspension. This can damage the conductor system and its suspension.

SUMMARY OF THE INVENTION

It is therefore the objective of this invention to introduce a radar-type level meter permitting easy prevention of any damage to the conductor system and its suspension.

In an enhanced version of the above-described level meter design, this objective is achieved in that a tensile-load testing device is positioned between the suspension and at least a section of the electric conductor system, featuring a break point for the electromagnetic signal, with the distance between the break point and the signal transmitter and, respectively, the signal receiver being a function of the tensile load bearing on the conductor system.

Thus, the invention employs the actual TDR measuring function for measuring the reflection of the electromagnetic signal and the associated signal runtime at a break point, in this fashion testing the tensile load to which the conductor system is exposed. To that effect the tensile-load testing device is so designed that the break point provided in it moves up or down depending on the tensile stress exerted on the conductor system.

It would, in essence, be possible to configure the conductor system as a multi-part assembly, whereby the suspension would connect directly to at least a first segment of the conductor system, while the tensile-load testing device would then be positioned between that first or a subsequent segment of the conductor system and another segment of the conductor system below it. However, the tensile-load testing device can detect only those tensile forces that act on the segments of the conductor system situated below it. Therefore, in a preferred embodiment of the invention, the tensile-load testing device is positioned at the upper end of the electric conductor system.

While the invention is suitable for use with a dual-conductor system as well, the electric conductor system in a preferred embodiment of the invention is a single-conductor system. Specifically, in a preferred embodiment of the invention, the single-conductor system is in the form of a monocable. This is because monocables can be used in simple and dependable fashion especially over great distances as well as in granular bulk-material applications.

In another preferred embodiment of the invention, the tensile-load testing device includes an elastic element whose extension depends on the tensile load bearing on it. The extension of the elastic element does not necessarily have to be in a linear relation to the tensile load. Even in the case of a nonlinear relationship, an appropriate calibration of the tensile-load testing device will permit a determination of the tensile load via the movement of the break point. However, in a preferred embodiment of the invention the extension of the elastic element is proportional to the tensile load to which it is exposed. This obviates the need for any particular calibration, greatly simplifying the use of a corresponding tensile-load testing device.

The elastic element could be one out of any number of devices, even including suitably strong elastic bands. According to a preferred implementation of the invention, however, the elastic element is a spring, preferably a coil spring by means of which the conductor system is attached to the suspension. A spring offers an advantage in that at least in its elastic region, its deflection is a function of the force acting on it.

A particularly preferred configuration of the tensile-load testing device consists in a design whereby the coil spring is contained in a sleeve. If, as specified in another preferred embodiment of the invention, the sleeve is attached to the conductor system in a way whereby, depending on the tensile force bearing on the conductor system, a variably long section of the suspension is enclosed by the sleeve, the transition from the suspension to the surrounding sleeve will produce a break point for the electromagnetic signal, resulting in an amply detectable retroreflection. The greater the tensile load on the conductor system, the farther down the break point, defined by the end of the sleeve, will be situated, leading to a correspondingly longer runtime.

In this context, it should be mentioned that, while in the configuration described above the distance between the break point and the signal transmitter or, respectively, the signal receiver will increase as the tensile load increases, according to the invention, this does not absolutely have to be the case.

The tensile-load testing device may be configured in a way whereby, via a reversing mechanism, the break point can progressively move closer to the signal transmitter or signal receiver as the tensile load on the conductor system increases.

The following description will explain this invention in more detail with reference to the attached drawing.

BRIEF DESCRIPTION OF THE DRAWING

The single FIGURE is a schematic cross-sectional illustration of the transition from the suspension to the conductor system in a level meter employing the radar principle in accordance with a preferred embodiment of the invention.

DESCRIPTION OF A PREFERRED EMBODIMENT

The single FIGURE shows only the inventive aspects of the level meter, specifically the conductor system 1 in the form of a monocable, the suspension 2 for attaching the conductor system 1 to a cover flange 10a of a container 10, and a tensile-load testing device 3. The tensile-load testing device 3 comprises a coil spring 4 by way of which the conductor system 1 is attached to the suspension 2. Also provided is a sleeve 5 that is attached to the conductor system 1 and houses the coil spring 4, while surrounding the lower end section of the suspension 2.

As a function of the tensile load, indicated by an arrow A, bearing on the conductor system 1, the coil spring 4 will extend, causing the conductor system 1, together with the sleeve 5 attached to its upper end, to move downward. As a result, indicated by another arrow B, the upper rim 6 of the sleeve 5 will on its part move downward, thus enclosing a shorter section of the suspension 2.

It follows then that the rim 6 of the sleeve 5, defining a break point 8 for the electromagnetic signal, moves farther down, away from a signal transmitter receiver 7 mounted to the top of suspension 2. Accordingly, the distance 9 between the break point 8 and the transmitter/receiver 7 is a function of the tensile load bearing on the conductor system 1. The runtime change of the component of the electromagnetic signal reflected at the rim 6 of the sleeve 5 thus permits a determination of the tensile load on the conductor system 1. Providing a threshold value at which an alarm signal is triggered can prevent damage to the conductor system 1 and the suspension 2.

The invention claimed is:

1. A level meter, employing the radar principle for measuring the fill level of a medium in a container, with a signal transmitter serving to transmit an electromagnetic signal, an electric conductor system for conducting the electromagnetic signal into the container and returning reflected components of the electromagnetic signal from the container, and a signal receiver serving to receive the reflected components of the electromagnetic signal, said electric conductor system provided at its upper end with a suspension by which it is attached to a device on the container, wherein a tensile-load testing device is interpositioned between the suspension and at least a part of the electric conductor system, said testing device including a break point surface on said part, said electromagnetic signal from the transmitter reflecting from the break point surface as one of said reflected components received by the signal receiver, the runtime of said one reflected component as determined by the level meter being a function of the tensile load bearing on the conductor system.

2. The level meter as in claim 1, wherein the tensile-load testing device is positioned at the upper end of the electric conductor system.

3. The level meter as in claim 1 or 2, wherein the electric conductor system is a single-conductor system.

4. The level meter as in claim 3, wherein the single-conductor system is a monocable.

5. The level meter as in claim 1 or 2, wherein the tensile-load testing device comprises an elastic element whose extension is a function of the tensile load bearing on it.

6. The level meter as in claim 5, wherein the extension of the elastic element is proportional to the tensile load to which it is exposed.

7. The level meter as in claim 6, wherein the elastic element is a spring by means of which the conductor system is attached to the suspension.

8. The level meter as in claim 7, wherein the spring is a coil spring contained in a sleeve.

9. The level meter as in claim 8, wherein the sleeve is attached to the conductor system and encloses a section of the suspension whose length varies as a function of the tensile load bearing on the conductor system.

10. The level meter as in claim 1 wherein the level meter issues an alarm signal when said tensile load exceeds a selected threshold value.

* * * * *